United States Patent Office 2,853,307
Patented Sept. 23, 1958

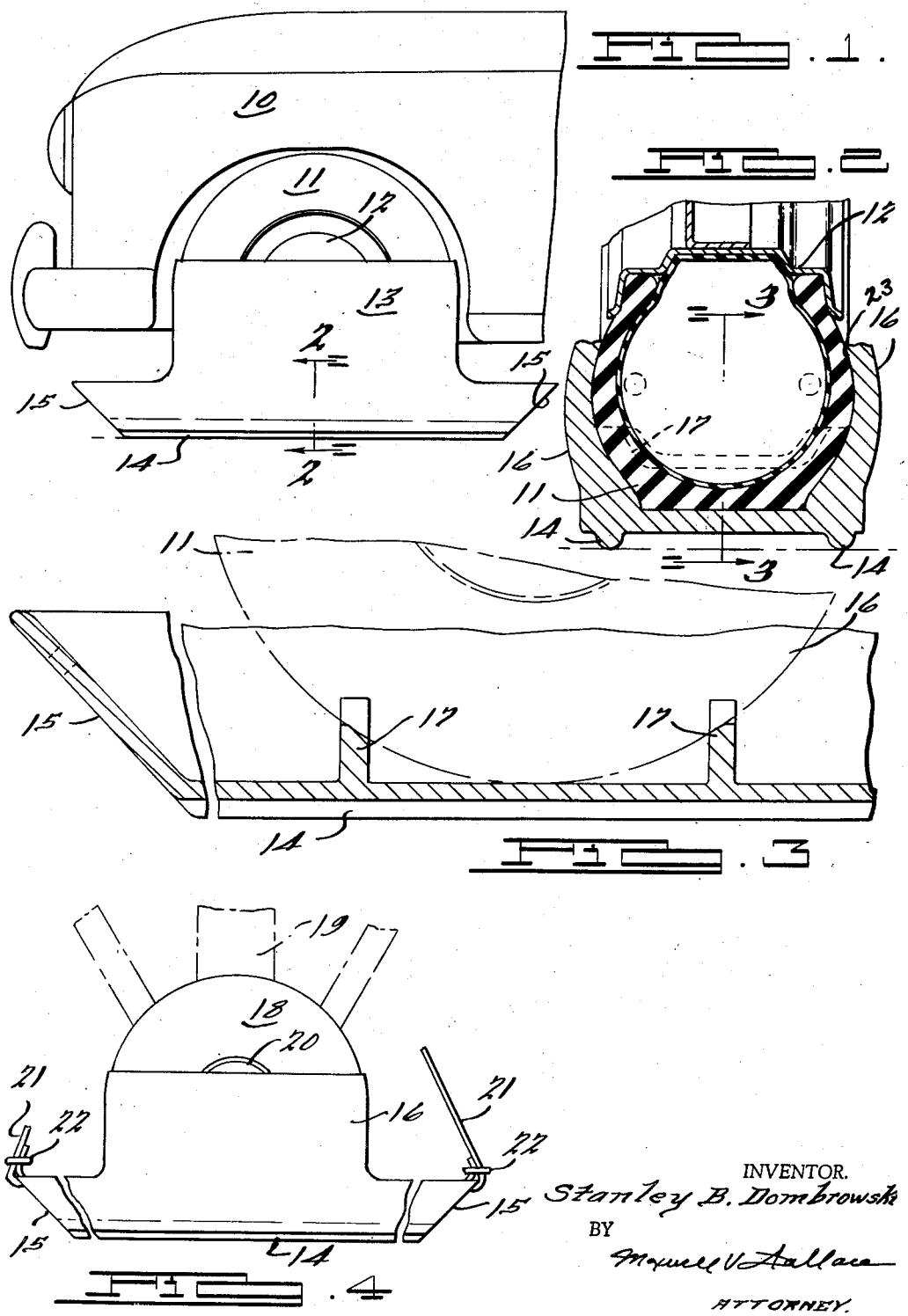

2,853,307

SLEIGH RUNNERS FOR AUTOMOBILES AND AIRPLANES

Stanley B. Dombrowski, Grosse Pointe, Mich.

Application May 2, 1957, Serial No. 656,662

1 Claim. (Cl. 280—13)

This invention relates to sleigh runners, skis or skates for use with motor vehicles, trailers, wagons, airplanes, or the like, and more particularly to an attachment which may be quickly engaged upon the non-driving wheels of any vehicle, or the landing gear of an airplane so that they may be more readily used even in deep snow without danger of side slipping and whereby there may be obtained all the advantages of sled surfacing.

The principal object of the invention is to provide a new and improved attachment of the character described which does not necessitate the removal from the wheels of the vehicle, or the landing gear of an airplane, of the tires and is so constructed that the device may be affixed and firmly held by air pressure from within the tire, and prevented from subsequent displacement therefrom by the air pressure within the tire as it rides within the ski.

A still further object of the invention is to provide a ski of the type described that may be readily applied to a wheel of the landing gear of an airplane and in a manner whereby the usual tire of such wheel continues to provide means to absorb the landing shocks and also to continue to support the weight of the airplane, via its greater surfacing contact.

Another object of the invention is to provide a ski of the type described with means for maintaining the same in working position upon airplane landing wheels wherein the skis are firmly maintained in position and so pressed and fixed as to be free of forward, rearward, sideways or upward movement relative to the wheels with which they are engaged.

The above and other objects of the invention will appear more clearly from the following more detailed description, and from the drawing, wherein:

Fig. 1 is a front end view of an automobile showing the runner positioned on the wheel.

Fig. 2 is a section taken substantially along line 2—2 of Fig. 1.

Fig. 3 is a section taken substantially along line 3—3 of Fig. 2; and

Fig. 4 is a modification showing the runner or ski attached to an airplane wheel.

Referring now to the drawing, the numeral 10 designates the front or hood portion of an automobile and 12 a conventional design of automobile front wheel upon the periphery of which is the usual pneumatic tire 11. The device per se consists of a relatively elongated runner or ski member constructed of metal, or any other suitable material 13, having secured to the bottom half thereof a pair of opposed runners 14 running the entire length of the bottom of the ski and having the front portion of the main body section as well as the rear body portion thereof, curved upwardly as at 15, and having the center side members of a height greater than the center diameter of the wheel, and curved, as at 16. The inner portion of center side members 16 is cored out, as at 23, to form a cavity said cavity being formed to correspond to the shape of the tire being used on the particular vehicle to which it is being attached. Suitably positioned within and secured to the bottom and sides of the ski member, are a pair of opposed rib members 17, Figs. 2 and 3 of the drawing, the same being adapted to act as a pair of tire supporting members, as well as supporting rib members to strengthen the entire assembly.

In Fig. 4 there is disclosed a runner or ski member, similar in detail to that disclosed in Figs. 1 through 3 of the drawing, with the exception that the member is longer, as is the custom with airplane skis—the tire 18 being rotatably supported on wheel member 20, which in turn is supported by means of landing gear struts 19. Cable members 21 are secured to the opposed top ends of the ski, as at 22, and are tied to strut members 19 to prevent tilting of the ski upon landing.

The manner in which the device operates is as follows:

When the device is used upon any non-driving wheels of a vehicle the runners are placed upon a flat surface, and in the case of a vehicle it may be jacked-up, as when one desires to change a flat tire, and the skis are placed beneath the tires to be attached to the skis. The valve stem of the tire is then removed and all air removed from the tire. The vehicle wheels are then lowered and the tire allowed to enter cavity 23 and nest within same. The valve stem is then replaced in the tire and air pressure applied until the tire is inflated to its normal size and air pressure for the size tire being used. As the tire expands within the cavity formed to receive same, the outer walls of the tire engage firmly the inner walls of the cavity, which is formed to correspond to the exact contour of the tire being used, causing the tire and cavity wall to become interlocked, as shown best in Fig. 2 of the drawing, and the bottom of the tire to be cradled between opposed ribs 17, Fig. 3 of the drawing. Inasmuch as the central portion of the ski, which contains the tire cavity, is built above the center diameter of the wheel, as shown best in Fig. 1, the ski cannot become disengaged from the inflated tire.

The skis or runners are made in various sizes to fit the different sizes and shapes of tires now on the market from the small tires used on English-type cars to the largest truck tires, and also tires used for wheelbarrows, waggons, and also airplane tires of all sizes.

When securing skis to an airplane, the same procedure outlined above is followed, or the plane may be run onto the skis and the air removed from the tires and then refilled to engage the skis. The only additional step needed is to attach cables 21 to strut members 19, and this solely for the purpose of preventing the skis from tilting when they come in contact with the ground as the plane is brought to a landing.

Once the tire of any vehicle is locked within the cavity of the runner or ski the vehicle may be moved from place to place upon the runners beneath the skis 14 through deep snow, or upon ice, without becoming disengaged, nor will there be a tendency to side-slip or side skid when this device is used.

There has been disclosed herein a new and unique runner or ski that is cheap to manufacture and quick to install. There are no complicated attaching means necessary for use in engaging the runner to a tire or to disengage the same when needed—simply deflate the tire, insert within the ski cavity and again inflate the tire and the device is ready for use. When one wants to disengage the device from the tire, simply deflate the tire and the device is quickly removed. The cable members used with an airplane landing gear have nothing to do with the ski's engagement with the tire, but are used simply to keep the skis in balance upon the plane so that there will be no tilting as the wheels touch the ground when landing.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

A sleigh runner for use in combination with a wheel supporting a pneumatic tire, said runner comprising an elongated sled member tapered at both ends, and having the central portion thereof extending to a height above the center diameter of said wheel, a cavity formed within said central portion of said runner corresponding to the shape of said tire, tire supporting ribs within said cavity, said cavity being adapted to receive a deflated tire and to hold the same securely in interlocked relationship within said cavity upon said rib members when the tire has been fully inflated, and opposed sled runner members secured to the bottom of said sleigh runner.

References Cited in the file of this patent

UNITED STATES PATENTS

| | | |
|---|---|---|
| 773,959 | Meissner | Nov. 1, 1904 |
| 2,321,561 | Bircher | June 8, 1943 |
| 2,589,602 | Clark | Mar. 18, 1952 |